(12) United States Patent
Banerjea et al.

(10) Patent No.: US 9,655,041 B1
(45) Date of Patent: *May 16, 2017

(54) DISCOVERY-PHASE POWER CONSERVATION

(71) Applicant: Marvell International Ltd., Hamilton (BM)

(72) Inventors: Raja Banerjea, Sunnyvale, CA (US); Sandesh Goel, Noida (IN); Milind Kopikare, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 56 days.

This patent is subject to a terminal disclaimer.

(21) Appl. No.: 15/066,836

(22) Filed: Mar. 10, 2016

Related U.S. Application Data

(63) Continuation of application No. 12/646,802, filed on Dec. 23, 2009, now Pat. No. 9,288,764.

(60) Provisional application No. 61/141,724, filed on Dec. 31, 2008.

(51) Int. Cl.
 *G08C 17/00* (2006.01)
 *H04B 7/185* (2006.01)
 *H04W 52/02* (2009.01)
 *H04W 48/16* (2009.01)

(52) U.S. Cl.
 CPC ....... *H04W 52/0206* (2013.01); *H04W 48/16* (2013.01)

(58) Field of Classification Search
 CPC ..... H04W 48/00; H04W 48/02; H04W 48/04; H04W 48/08; H04W 48/10; H04W 52/00; H04W 52/02; H04W 52/0206; H04W 52/0225; H04W 52/38; H04W 88/08; H04W 48/16; H04W 8/005; H04W 52/04; H04W 52/18; H04W 52/283
 USPC ....... 370/311, 318, 410, 426, 491, 496, 500, 370/522
 See application file for complete search history.

(56) References Cited

U.S. PATENT DOCUMENTS

| 4,337,463 | A | 6/1982 | Vangen |
| 4,805,215 | A | 2/1989 | Miller |
| 5,347,234 | A | 9/1994 | Gersbach et al. |

(Continued)

FOREIGN PATENT DOCUMENTS

| CN | 101044714 | 9/2007 |
| CN | 102067689 | 5/2011 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331; V10.5.0; 3GPP Organizational Partners, Mar. 2012, 302 pages.

(Continued)

*Primary Examiner* — Hoang-Chuong Vu

(57) ABSTRACT

The present specification describes techniques and apparatuses that enable power conservation in a wireless network. In some cases these techniques and apparatuses enable power conservation during a discovery phase and for a wireless network subject to a government mandate requiring a device of the network to passively search for radar transmission prior to establishing communication with another device of the network.

20 Claims, 6 Drawing Sheets

(56) References Cited

U.S. PATENT DOCUMENTS

| | | |
|---|---|---|
| 5,634,207 A | 5/1997 | Yamaji et al. |
| 5,673,291 A | 9/1997 | Dent |
| 5,708,656 A | 1/1998 | Noneman et al. |
| 5,847,616 A | 12/1998 | Ng et al. |
| 5,995,819 A | 11/1999 | Yamaji et al. |
| 6,035,210 A | 3/2000 | Endo et al. |
| 6,167,245 A | 12/2000 | Welland et al. |
| 6,285,262 B1 | 9/2001 | Kuriyama |
| 6,320,919 B1 | 11/2001 | Khayrallah et al. |
| 6,347,091 B1 | 2/2002 | Wallentin et al. |
| 6,366,622 B1 | 4/2002 | Brown et al. |
| 6,374,117 B1 | 4/2002 | Denkert et al. |
| 6,438,364 B1 | 8/2002 | Waite |
| 6,445,342 B1 | 9/2002 | Thomas et al. |
| 6,452,458 B1 | 9/2002 | Tanimoto |
| 6,509,777 B2 | 1/2003 | Razavi et al. |
| 6,519,461 B1 | 2/2003 | Andersson et al. |
| 6,535,037 B2 | 3/2003 | Maligeorgos |
| 6,553,229 B1 | 4/2003 | Dent |
| 6,640,308 B1 | 10/2003 | Keyghobad et al. |
| 6,650,195 B1 | 11/2003 | Brunn et al. |
| 6,675,328 B1 | 1/2004 | Krishnamachari et al. |
| 6,741,846 B1 | 5/2004 | Welland et al. |
| 6,741,862 B2 | 5/2004 | Chung et al. |
| 6,754,189 B1 | 6/2004 | Cloutier et al. |
| 6,760,671 B1 * | 7/2004 | Batcher ............... H04B 1/715 370/342 |
| 6,816,452 B1 | 11/2004 | Maehata |
| 6,816,718 B2 | 11/2004 | Yan et al. |
| 6,829,313 B1 | 12/2004 | Xu |
| 6,922,433 B2 | 7/2005 | Tamura |
| 6,934,566 B2 | 8/2005 | Kang et al. |
| 6,946,950 B1 | 9/2005 | Ueno et al. |
| 6,954,708 B2 | 10/2005 | Rakshani et al. |
| 7,079,811 B2 | 7/2006 | Lee et al. |
| 7,139,540 B2 | 11/2006 | Wu et al. |
| 7,173,431 B1 | 2/2007 | Lo et al. |
| 7,180,901 B2 | 2/2007 | Chang et al. |
| 7,200,799 B2 | 4/2007 | Wang et al. |
| 7,206,840 B2 | 4/2007 | Choi et al. |
| 7,212,798 B1 | 5/2007 | Adams et al. |
| 7,213,194 B2 | 5/2007 | Nieminen |
| 7,218,691 B1 | 5/2007 | Narasimhan |
| 7,239,882 B1 | 7/2007 | Cook |
| 7,257,095 B2 | 8/2007 | Liu |
| 7,286,009 B2 | 10/2007 | Andersen et al. |
| 7,298,183 B2 | 11/2007 | Mirzaei et al. |
| 7,308,033 B2 | 12/2007 | Yu et al. |
| 7,310,023 B2 | 12/2007 | Cha et al. |
| 7,319,849 B2 | 1/2008 | Womac |
| 7,342,895 B2 | 3/2008 | Serpa et al. |
| 7,355,416 B1 | 4/2008 | Darshan |
| 7,377,441 B2 | 5/2008 | Wiklof et al. |
| 7,395,040 B2 | 7/2008 | Behzad |
| 7,403,018 B1 | 7/2008 | Lo et al. |
| 7,447,163 B1 | 11/2008 | Thomson et al. |
| 7,529,548 B2 | 5/2009 | Sebastian |
| 7,551,948 B2 | 6/2009 | Meier et al. |
| 7,564,826 B2 | 7/2009 | Sherman et al. |
| 7,580,397 B2 * | 8/2009 | Arai ..................... H04W 48/20 370/338 |
| 7,595,768 B2 | 9/2009 | Li et al. |
| 7,599,671 B2 | 10/2009 | Kopikare et al. |
| 7,616,935 B2 | 11/2009 | Fernandez-Corbaton et al. |
| 7,626,966 B1 | 12/2009 | Ruiter et al. |
| 7,656,205 B2 | 2/2010 | Chen et al. |
| 7,659,003 B2 | 2/2010 | Aoki et al. |
| 7,672,645 B2 | 3/2010 | Kilpatrick et al. |
| 7,686,216 B2 | 3/2010 | Walczyk et al. |
| 7,689,190 B2 | 3/2010 | Kerth et al. |
| 7,711,004 B2 | 5/2010 | Xu |
| 7,826,411 B2 | 11/2010 | Gonikberg et al. |
| 7,849,333 B2 | 12/2010 | Schindler |
| 7,876,786 B2 | 1/2011 | Bahl et al. |
| 7,881,746 B2 | 2/2011 | Desai |
| 7,881,755 B1 * | 2/2011 | Mishra ............... H04W 52/0229 455/574 |
| 7,898,948 B2 | 3/2011 | DiGirolamo et al. |
| 7,936,714 B1 | 5/2011 | Karr et al. |
| 7,944,867 B2 | 5/2011 | Usuba |
| 7,957,340 B2 | 6/2011 | Choi et al. |
| 7,965,710 B1 | 6/2011 | Choi |
| 7,966,036 B2 | 6/2011 | Kojima |
| 7,995,544 B2 | 8/2011 | Benveniste |
| 8,000,715 B2 | 8/2011 | Melpignano et al. |
| 8,014,329 B2 | 9/2011 | Gong |
| 8,060,017 B2 | 11/2011 | Schlicht et al. |
| 8,064,363 B2 | 11/2011 | Kohvakka et al. |
| 8,072,913 B2 | 12/2011 | Desai |
| 8,077,652 B2 | 12/2011 | Thesling |
| 8,078,111 B2 | 12/2011 | Jovicic et al. |
| 8,081,038 B2 | 12/2011 | Lee et al. |
| 8,107,391 B2 | 1/2012 | Wu et al. |
| 8,139,670 B1 | 3/2012 | Son et al. |
| 8,140,075 B2 | 3/2012 | Watanabe |
| 8,149,715 B1 | 4/2012 | Goel |
| 8,150,328 B2 | 4/2012 | Chaudhri et al. |
| 8,170,002 B2 | 5/2012 | Wentink |
| 8,170,546 B2 | 5/2012 | Bennett |
| 8,187,662 B2 | 5/2012 | Blinn et al. |
| 8,189,506 B2 | 5/2012 | Kneckt et al. |
| 8,203,985 B2 | 6/2012 | Gong et al. |
| 8,204,015 B2 | 6/2012 | Chaudhri et al. |
| 8,229,087 B2 | 7/2012 | Sumioka et al. |
| 8,254,296 B1 | 8/2012 | Lambert |
| 8,274,894 B2 | 9/2012 | Kneckt et al. |
| 8,275,314 B1 | 9/2012 | Lin |
| 8,310,967 B1 | 11/2012 | Goel |
| 8,315,564 B2 | 11/2012 | Banerjea |
| 8,340,034 B1 | 12/2012 | Lee |
| 8,364,188 B2 | 1/2013 | Srinivasan et al. |
| 8,369,782 B1 | 2/2013 | Lin et al. |
| 8,472,427 B1 | 6/2013 | Wheeler et al. |
| 8,472,968 B1 | 6/2013 | Kim |
| 8,483,740 B2 | 7/2013 | Somasundaram et al. |
| 8,532,041 B1 | 9/2013 | Lambert et al. |
| 8,553,561 B1 | 10/2013 | Chokshi et al. |
| 8,571,479 B2 | 10/2013 | Banerjea |
| 8,577,305 B1 | 11/2013 | Rossi et al. |
| 8,588,705 B1 | 11/2013 | Tsui et al. |
| 8,600,324 B1 | 12/2013 | Cousinard et al. |
| 8,649,734 B1 | 2/2014 | Lin et al. |
| 8,655,279 B2 | 2/2014 | Banerjea |
| 8,737,370 B2 | 5/2014 | Wentink |
| 8,750,278 B1 | 6/2014 | Wagholikar et al. |
| 8,767,771 B1 | 7/2014 | Shukla et al. |
| 8,817,662 B2 | 8/2014 | Mahaffy et al. |
| 8,817,682 B1 | 8/2014 | Goel et al. |
| 8,861,469 B1 | 10/2014 | Lee et al. |
| 8,891,497 B1 | 11/2014 | Vleugels |
| 8,902,745 B1 | 12/2014 | Goel et al. |
| 9,036,517 B2 | 5/2015 | Bijwe |
| 9,072,047 B1 | 6/2015 | Goel et al. |
| 9,078,108 B1 | 7/2015 | Wagholika et al. |
| 9,125,216 B1 | 9/2015 | Choi et al. |
| 9,332,488 B2 | 5/2016 | Mahaffy et al. |
| 2002/0025810 A1 | 2/2002 | Takayama et al. |
| 2002/0049854 A1 | 4/2002 | Cox et al. |
| 2002/0102941 A1 | 8/2002 | Kuiri et al. |
| 2003/0040316 A1 | 2/2003 | Stanforth et al. |
| 2003/0148750 A1 | 8/2003 | Yan et al. |
| 2003/0198200 A1 | 10/2003 | Diener et al. |
| 2003/0214430 A1 * | 11/2003 | Husted .................... G01S 7/021 342/57 |
| 2004/0013128 A1 | 1/2004 | Moreton |
| 2004/0063403 A1 | 4/2004 | Durrant |
| 2004/0105401 A1 * | 6/2004 | Lee .................. H04W 52/0216 370/311 |
| 2004/0110470 A1 | 6/2004 | Tsien et al. |
| 2004/0162106 A1 | 8/2004 | Monroe et al. |
| 2004/0192222 A1 | 9/2004 | Vaisanen et al. |
| 2004/0198297 A1 | 10/2004 | Oh et al. |
| 2004/0214575 A1 | 10/2004 | Jovanovic |
| 2004/0233881 A1 | 11/2004 | Kang et al. |

(56) References Cited

U.S. PATENT DOCUMENTS

| | | |
|---|---|---|
| 2004/0242192 A1 | 12/2004 | Marce et al. |
| 2004/0264372 A1 | 12/2004 | Huang |
| 2004/0264396 A1 | 12/2004 | Ginzburg et al. |
| 2004/0264397 A1 | 12/2004 | Benveniste |
| 2005/0018641 A1 | 1/2005 | Zhao et al. |
| 2005/0025104 A1 | 2/2005 | Fischer et al. |
| 2005/0025174 A1 | 2/2005 | Fischer et al. |
| 2005/0041581 A1 | 2/2005 | Kuusinen et al. |
| 2005/0043027 A1 | 2/2005 | Emeott et al. |
| 2005/0047386 A1 | 3/2005 | Yi |
| 2005/0058151 A1 | 3/2005 | Yeh |
| 2005/0064840 A1 | 3/2005 | Heydari et al. |
| 2005/0090218 A1 | 4/2005 | Ishida et al. |
| 2005/0120119 A1 | 6/2005 | Bhanu et al. |
| 2005/0135360 A1 | 6/2005 | Shin et al. |
| 2005/0174962 A1 | 8/2005 | Gurevich |
| 2005/0186962 A1 | 8/2005 | Yoneyama et al. |
| 2005/0195786 A1* | 9/2005 | Shpak ............... H04W 52/08 370/338 |
| 2005/0206554 A1* | 9/2005 | Yamaura ............. H04B 1/401 342/70 |
| 2005/0233704 A1 | 10/2005 | Maekawa |
| 2005/0250528 A1* | 11/2005 | Song ............... H04W 52/325 455/522 |
| 2005/0254423 A1 | 11/2005 | Berghoff |
| 2005/0281278 A1 | 12/2005 | Black et al. |
| 2006/0007863 A1 | 1/2006 | Naghian |
| 2006/0049880 A1 | 3/2006 | Rein et al. |
| 2006/0063509 A1 | 3/2006 | Pincu et al. |
| 2006/0079232 A1 | 4/2006 | Omori et al. |
| 2006/0114044 A1 | 6/2006 | Mintchev et al. |
| 2006/0120338 A1* | 6/2006 | Hwang ............... H04W 52/24 370/338 |
| 2006/0128308 A1 | 6/2006 | Michael et al. |
| 2006/0128347 A1 | 6/2006 | Piriyapoksombut et al. |
| 2006/0189359 A1 | 8/2006 | Kammer et al. |
| 2006/0199565 A1* | 9/2006 | Ammirata ........... H04L 63/08 455/411 |
| 2006/0200862 A1* | 9/2006 | Olson ............. H04L 63/1433 726/23 |
| 2006/0215601 A1 | 9/2006 | Vleugels et al. |
| 2006/0223474 A1 | 10/2006 | Yoshizaki et al. |
| 2006/0239443 A1 | 10/2006 | Oxford et al. |
| 2006/0251198 A1 | 11/2006 | Ma et al. |
| 2006/0252418 A1* | 11/2006 | Quinn ............... H04W 16/10 455/423 |
| 2006/0264179 A1* | 11/2006 | Bonneville ......... H04W 24/00 455/67.11 |
| 2006/0268756 A1 | 11/2006 | Wang et al. |
| 2006/0268804 A1 | 11/2006 | Kim et al. |
| 2006/0281404 A1 | 12/2006 | Lee et al. |
| 2006/0282541 A1 | 12/2006 | Hiroki |
| 2006/0282667 A1 | 12/2006 | Kim et al. |
| 2006/0286935 A1* | 12/2006 | Utsunomiya ....... H04W 16/14 455/63.1 |
| 2007/0010237 A1 | 1/2007 | Jones et al. |
| 2007/0010247 A1 | 1/2007 | Mouna-Kingue et al. |
| 2007/0014314 A1 | 1/2007 | O'Neil |
| 2007/0026810 A1 | 2/2007 | Love et al. |
| 2007/0032211 A1* | 2/2007 | Kopikare ............. G01S 7/021 455/136 |
| 2007/0060057 A1* | 3/2007 | Matsuo ............. H04B 1/0475 455/63.1 |
| 2007/0077908 A1 | 4/2007 | Vorenkamp et al. |
| 2007/0081553 A1 | 4/2007 | Cicchetti et al. |
| 2007/0103829 A1 | 5/2007 | Darshan et al. |
| 2007/0109973 A1 | 5/2007 | Trachewsky |
| 2007/0142080 A1 | 6/2007 | Tanaka et al. |
| 2007/0173286 A1 | 7/2007 | Carter et al. |
| 2007/0178888 A1 | 8/2007 | Alfano et al. |
| 2007/0183368 A1 | 8/2007 | Stavinov |
| 2007/0183443 A1 | 8/2007 | Won |
| 2007/0200622 A1 | 8/2007 | Filoramo et al. |
| 2007/0202814 A1 | 8/2007 | Ono et al. |
| 2007/0206519 A1 | 9/2007 | Hansen et al. |
| 2007/0206762 A1 | 9/2007 | Chandra et al. |
| 2007/0223430 A1 | 9/2007 | Desai et al. |
| 2007/0223626 A1 | 9/2007 | Waxman |
| 2007/0237122 A1 | 10/2007 | Liu et al. |
| 2007/0238482 A1 | 10/2007 | Rayzman et al. |
| 2007/0242645 A1 | 10/2007 | Stephenson et al. |
| 2007/0263587 A1* | 11/2007 | Savoor ............. H04L 41/5019 370/346 |
| 2007/0264959 A1 | 11/2007 | Carrez |
| 2007/0268862 A1 | 11/2007 | Singh et al. |
| 2007/0268976 A1 | 11/2007 | Brink et al. |
| 2007/0280471 A1 | 12/2007 | Fallahi et al. |
| 2007/0284441 A1 | 12/2007 | Walczyk et al. |
| 2007/0286298 A1 | 12/2007 | Choi et al. |
| 2007/0297388 A1 | 12/2007 | Appaji et al. |
| 2008/0027033 A1 | 1/2008 | Gonda et al. |
| 2008/0045162 A1 | 2/2008 | Rofougaran et al. |
| 2008/0056201 A1 | 3/2008 | Bennett |
| 2008/0069034 A1 | 3/2008 | Buddhikot et al. |
| 2008/0076466 A1 | 3/2008 | Larsson |
| 2008/0080446 A1* | 4/2008 | Chung ............... H04B 17/318 370/342 |
| 2008/0095058 A1 | 4/2008 | Dalmases et al. |
| 2008/0095059 A1 | 4/2008 | Chu |
| 2008/0100494 A1* | 5/2008 | Yamaura ............. H04B 1/401 342/20 |
| 2008/0111639 A1 | 5/2008 | Ryckaert et al. |
| 2008/0129118 A1 | 6/2008 | Diab |
| 2008/0130595 A1 | 6/2008 | Abdel-Kader |
| 2008/0137580 A1 | 6/2008 | Axelsson et al. |
| 2008/0139212 A1 | 6/2008 | Chen et al. |
| 2008/0161031 A1 | 7/2008 | Tu |
| 2008/0170550 A1 | 7/2008 | Liu et al. |
| 2008/0181154 A1 | 7/2008 | Sherman |
| 2008/0187003 A1 | 8/2008 | Becker |
| 2008/0232287 A1 | 9/2008 | Shao et al. |
| 2008/0238679 A1 | 10/2008 | Rofougaran et al. |
| 2008/0259846 A1 | 10/2008 | Gonikberg et al. |
| 2008/0261552 A1 | 10/2008 | Chung |
| 2008/0261640 A1 | 10/2008 | Yoshida |
| 2008/0262991 A1 | 10/2008 | Kapoor et al. |
| 2008/0272818 A1 | 11/2008 | Ko |
| 2008/0279163 A1 | 11/2008 | Desai |
| 2008/0310067 A1 | 12/2008 | Diab et al. |
| 2008/0320108 A1 | 12/2008 | Murty et al. |
| 2009/0005061 A1 | 1/2009 | Ward et al. |
| 2009/0010210 A1 | 1/2009 | Hiertz et al. |
| 2009/0046625 A1* | 2/2009 | Diener ............... H04L 1/0001 370/319 |
| 2009/0080390 A1 | 3/2009 | Zhou et al. |
| 2009/0137206 A1 | 5/2009 | Sherman et al. |
| 2009/0143043 A1 | 6/2009 | Yoshizaki et al. |
| 2009/0168686 A1 | 7/2009 | Love et al. |
| 2009/0168725 A1 | 7/2009 | Mishra |
| 2009/0170497 A1 | 7/2009 | Miao et al. |
| 2009/0175250 A1 | 7/2009 | Mathur et al. |
| 2009/0190541 A1 | 7/2009 | Abedi |
| 2009/0196210 A1 | 8/2009 | Desai |
| 2009/0196227 A1 | 8/2009 | Bahr |
| 2009/0202013 A1 | 8/2009 | Sebastian |
| 2009/0209288 A1 | 8/2009 | Rofougaran |
| 2009/0239471 A1 | 9/2009 | Tran et al. |
| 2009/0245133 A1 | 10/2009 | Gupta et al. |
| 2009/0245279 A1 | 10/2009 | Wan et al. |
| 2009/0247217 A1 | 10/2009 | Hsu et al. |
| 2009/0258603 A1 | 10/2009 | Ghaboosi et al. |
| 2009/0268652 A1 | 10/2009 | Kneckt et al. |
| 2009/0280762 A1 | 11/2009 | Park et al. |
| 2009/0285264 A1* | 11/2009 | Aldana ............... H04B 1/1027 375/139 |
| 2009/0291640 A1 | 11/2009 | Bhattad et al. |
| 2009/0311961 A1 | 12/2009 | Banerjea |
| 2009/0312027 A1 | 12/2009 | Foschini et al. |
| 2009/0316667 A1* | 12/2009 | Hirsch ............... H04B 1/406 370/338 |
| 2009/0321056 A1 | 12/2009 | Ran et al. |
| 2010/0009675 A1 | 1/2010 | Wijting et al. |

(56) References Cited

U.S. PATENT DOCUMENTS

| | | | |
|---|---|---|---|
| 2010/0011231 A1* | 1/2010 | Banerjea | H04W 52/0251 713/320 |
| 2010/0029325 A1 | 2/2010 | Wang et al. | |
| 2010/0039974 A1 | 2/2010 | Toshimitsu et al. | |
| 2010/0052796 A1 | 3/2010 | Menkhoff | |
| 2010/0061244 A1 | 3/2010 | Meier et al. | |
| 2010/0062799 A1 | 3/2010 | Ishii et al. | |
| 2010/0069112 A1 | 3/2010 | Sun et al. | |
| 2010/0077275 A1 | 3/2010 | Yu et al. | |
| 2010/0080319 A1 | 4/2010 | Blocher et al. | |
| 2010/0082957 A1 | 4/2010 | Iwata | |
| 2010/0097952 A1 | 4/2010 | McHenry et al. | |
| 2010/0103867 A1 | 4/2010 | Kishiyama et al. | |
| 2010/0124213 A1 | 5/2010 | Ise et al. | |
| 2010/0130129 A1 | 5/2010 | Chang et al. | |
| 2010/0138549 A1 | 6/2010 | Goel et al. | |
| 2010/0165896 A1 | 7/2010 | Gong et al. | |
| 2010/0216497 A1 | 8/2010 | Kawasaki | |
| 2010/0238793 A1 | 9/2010 | Alfano et al. | |
| 2010/0248734 A1 | 9/2010 | Yamazaki et al. | |
| 2010/0283654 A1 | 11/2010 | Waheed et al. | |
| 2010/0293293 A1 | 11/2010 | Beser | |
| 2010/0303026 A1 | 12/2010 | Chaudhri et al. | |
| 2010/0311342 A1* | 12/2010 | Arbel | H04H 60/43 455/62 |
| 2010/0316027 A1 | 12/2010 | Rick et al. | |
| 2010/0322213 A1 | 12/2010 | Liu et al. | |
| 2011/0002226 A1 | 1/2011 | Bhatti | |
| 2011/0007675 A1 | 1/2011 | Chiou et al. | |
| 2011/0009074 A1 | 1/2011 | Hsu et al. | |
| 2011/0021240 A1 | 1/2011 | Hiltunen et al. | |
| 2011/0053522 A1 | 3/2011 | Rofougaran et al. | |
| 2011/0069689 A1 | 3/2011 | Grandhi et al. | |
| 2011/0097998 A1 | 4/2011 | Ko et al. | |
| 2011/0103363 A1* | 5/2011 | Bennett | H04W 52/24 370/338 |
| 2011/0142014 A1 | 6/2011 | Banerjee et al. | |
| 2011/0161697 A1 | 6/2011 | Qi et al. | |
| 2011/0164538 A1 | 7/2011 | Karr et al. | |
| 2011/0194519 A1 | 8/2011 | Habetha | |
| 2011/0280219 A1 | 11/2011 | Fashandi et al. | |
| 2011/0292925 A1 | 12/2011 | Ho et al. | |
| 2012/0020319 A1 | 1/2012 | Song et al. | |
| 2012/0025921 A1 | 2/2012 | Yang et al. | |
| 2012/0039176 A1 | 2/2012 | Eshan et al. | |
| 2012/0099476 A1 | 4/2012 | Mahaffy et al. | |
| 2012/0244805 A1 | 9/2012 | Haikonen et al. | |
| 2012/0250576 A1 | 10/2012 | Rajamani et al. | |
| 2012/0276938 A1 | 11/2012 | Wagholikar et al. | |
| 2012/0327779 A1 | 12/2012 | Gell et al. | |
| 2013/0045687 A1 | 2/2013 | Banerjea | |
| 2013/0045688 A1 | 2/2013 | Banerjea | |
| 2013/0057344 A1 | 3/2013 | Touzard et al. | |
| 2013/0114548 A1 | 5/2013 | Banerjea | |
| 2013/0176903 A1 | 7/2013 | Bijwe | |
| 2013/0223418 A1 | 8/2013 | Schmidt | |
| 2013/0227152 A1 | 8/2013 | Lee et al. | |
| 2014/0004794 A1 | 1/2014 | Contaldo | |
| 2014/0044106 A1 | 2/2014 | Bhagwat | |
| 2014/0073251 A1 | 3/2014 | Banerjea | |
| 2014/0362735 A1 | 12/2014 | Mahaffy et al. | |

FOREIGN PATENT DOCUMENTS

| | | |
|---|---|---|
| EP | 1860827 | 11/2007 |
| EP | 2299642 | 3/2011 |
| EP | 2456275 | 5/2012 |
| JP | 2005303821 | 10/2005 |
| JP | 2006014312 | 1/2006 |
| JP | 2006148471 | 6/2006 |
| JP | 2006174162 | 6/2006 |
| JP | 200728568 | 2/2007 |
| JP | 2007028568 | 2/2007 |
| JP | 5776128 | 7/2015 |
| WO | WO-0178252 | 10/2001 |
| WO | WO-02082751 | 10/2002 |
| WO | WO-02091623 | 11/2002 |
| WO | WO-2006043956 | 4/2006 |
| WO | WO-2006090254 | 8/2006 |
| WO | WO-2007008981 | 1/2007 |
| WO | WO-2007064822 | 6/2007 |
| WO | WO-2008070777 | 6/2008 |
| WO | WO-2008150122 | 12/2008 |
| WO | WO-2009101567 | 8/2009 |
| WO | WO-2011056878 | 5/2011 |
| WO | WO-2013104989 | 7/2013 |
| WO | WO-2013119810 | 8/2013 |

OTHER PUBLICATIONS

"Advisory Action", U.S. Appl. No. 11/945,183, Nov. 9, 2010, 2 pages.

"Advisory Action", U.S. Appl. No. 12/190,251, Dec. 7, 2011, 3 pages.

"Advisory Action", U.S. Appl. No. 12/646,721, Aug. 13, 2013, 3 pages.

"Corrected Notice of Allowance", U.S. Appl. No. 13/735,458, Apr. 20, 2015, 2 pages.

"Draft Standard for Information Technology—Telecommunications and information exchange between systems—Local and metropolitan area networks—Specific requirements", IEEE P802.11s/D1.03, Apr. 2007, 251 pages.

"Final Office Action", U.S. Appl. No. 11/945,183, Sep. 13, 2010, 12 pages.

"Final Office Action", U.S. Appl. No. 12/186,429, Oct. 13, 2011, 23 pages.

"Final Office Action", U.S. Appl. No. 12/190,251, Sep. 13, 2011, 15 pages.

"Final Office Action", U.S. Appl. No. 12/323,292, Aug. 24, 2012, 26 pages.

"Final Office Action", U.S. Appl. No. 12/358,955, Feb. 17, 2012, 26 pages.

"Final Office Action", U.S. Appl. No. 12/358,955, Mar. 18, 2013, 12 pages.

"Final Office Action", U.S. Appl. No. 12/484,563, Apr. 24, 2012, 18 pages.

"Final Office Action", U.S. Appl. No. 12/487,425, May 3, 2012, 9 pages.

"Final Office Action", U.S. Appl. No. 12/534,361, Feb. 29, 2012, 13 pages.

"Final Office Action", U.S. Appl. No. 12/542,845, Apr. 23, 2014, 22 pages.

"Final Office Action", U.S. Appl. No. 12/542,845, Sep. 25, 2012, 23 pages.

"Final Office Action", U.S. Appl. No. 12/616,454, Apr. 11, 2012, 19 pages.

"Final Office Action", U.S. Appl. No. 12/646,721, Jun. 6, 2013, 16 pages.

"Final Office Action", U.S. Appl. No. 12/646,721, Nov. 28, 2014, 19 pages.

"Final Office Action", U.S. Appl. No. 12/646,802, Nov. 15, 2012, 15 pages.

"Final Office Action", U.S. Appl. No. 12/646,802, Dec. 17, 2014, 17 pages.

"Final Office Action", U.S. Appl. No. 12/759,336, Feb. 25, 2013, 11 pages.

"Final Office Action", U.S. Appl. No. 13/429,090, Jul. 16, 2014, 13 pages.

"Final Office Action", U.S. Appl. No. 14/466,687, Apr. 30, 2015, 13 pages.

"Foreign Office Action", CN Application No. 200980122587.0, Sep. 10, 2013, 11 Pages.

"Foreign Decision for Grant", WOJP Application No. 2013-534930, Jun. 9, 2015, 2 pages.

"Foreign Notice of Allowance", JP Application No. 2011-513586, Jul. 16, 2013, 2 pages.

(56) References Cited

OTHER PUBLICATIONS

"Foreign Office Action", CN Application No. 200980122587.0, Jan. 24, 2014, 10 Pages.
"Foreign Office Action", CN Application No. 200980122587.0, Feb. 21, 2013, 17 pages.
"Foreign Office Action", CN Application No. 201180050795.1, Sep. 1, 2015, 18 Pages.
"Foreign Office Action", EP Application No. 13169350.9, May 9, 2014, 3 Pages.
"Foreign Office Action", EP Application No. 09789754.0, May 17, 2011, 8 pages.
"Foreign Office Action", European Patent Application No. 09789754.0, Mar. 11, 2013, 4 Pages.
"Foreign Office Action", European Patent Application No. 09789754.0, Jul. 12, 2012, 4 pages.
"Foreign Office Action", JP Application No. 2011-513586, Apr. 9, 2013, 4 Pages.
"Foreign Office Action", JP Application No. 2011-513586, Oct. 23, 2012, 7 pages.
"Foreign Office Action", JP Application No. 2013-534930, Feb. 10, 2015, 3 Pages.
"Foreign Office Action", KR Application No. 10-2013-7012920, Sep. 11, 2015, 13 Pages.
"Further Higher Data Rate Extension in the 2.4 GHz Band", IEEE P802.11g/D8.2, Draft Supplement to Standard [for] Information Technology, Apr. 2003, 69 pages.
"IEEE Standard for Information Technology—Telecommunications and Information Exchange between Systems—Local and Metropolitan Area Networks—Specific Requirements", IEEE Std. 802.11-2007, Jun. 12, 2007, 1232 pages.
"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; Amendment 1: Radio Resource Measurement of Wireless LANs; IEEE Std 802.11k-2008, Jun. 12, 2008, 244 pages.
"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; IEEE Std. 802.11-2012, Mar. 29, 2012, 2793 pages.
"IEEE Standard for Information Technology Telecommunications and information exchange between systems Local and metropolitan area networks Specific requirements Part 11: Wireless LAN Medium Access Control (MAC) and Physical Layer (PHY) specifications Amendment", IEEE Computer Society, Oct. 14, 2010, pp. 12-18, 23, 65-68.
"Information Technology—Telecommunications and Information Exchange Between systems—Local and Metropolitan Area Networks—Specific Requirements", IEEE Standard, Aug. 1, 2005, pp. 1-60.
"Information Technology—Telecommunications and Information Exchange between Systems—Local and Metropolitan Area Networks—Specific Requirements", Part 11: Wireless LAN Medium Access Control (MAC) and Physical Layer (PHY) Specifications, IEEE Standard 802.11h-2003 (Amendment to IEEE Std 802.11-1993),Oct. 14, 2003, 80 pages.
"International Search Report and Written Opinion", Application No. PCT/US2013/025144, Jun. 5, 2013, 10 pages.
"International Search Report and Written Opinion", Application No. PCT/IB2013/001962, Feb. 6, 2014, 11 Pages.
"International Search Report and Written Opinion", Application No. PCT/US2012/035597, Aug. 6, 2012, 13 pages.
"International Search Report and Written Opinion", Application No. PCT/US2009/046289, Oct. 29, 2009, 13 pages.
"International Search Report and Written Opinion", Application No. PCT/US2011/054358, Dec. 16, 2011, 13 pages.
"International Search Report and Written Opinion", Application No. PCT/IB2013/000390, Aug. 21, 2013, 19 Pages.
"Introduction to 802.11n Outdoor Wireless Networks", InscapeData White Paper, Mar. 29, 2011, 9 pages.
"Non-Final Office Action", U.S. Appl. No. 13/429,071, Mar. 28, 2014, 8 pages.
"Non-Final Office Action", U.S. Appl. No. 13/429,090, Oct. 24, 2013, 13 pages.
"Non-Final Office Action", U.S. Appl. No. 11/945,183, Apr. 5, 2010, 8 pages.
"Non-Final Office Action", U.S. Appl. No. 12/167,841, Jul. 15, 2011, 10 pages.
"Non-Final Office Action", U.S. Appl. No. 12/186,429, Apr. 25, 2011, 19 pages.
"Non-Final Office Action", U.S. Appl. No. 12/190,240, Jan. 6, 2012, 7 pages.
"Non-Final Office Action", U.S. Appl. No. 12/190,251, Mar. 29, 2012, 11 pages.
"Non-Final Office Action", U.S. Appl. No. 12/190,251, Mar. 29, 2011, 8 pages.
"Non-Final Office Action", U.S. Appl. No. 12/235,333, Jun. 28, 2011, 16 pages.
"Non-Final Office Action", U.S. Appl. No. 12/323,292, Dec. 21, 2011, 17 pages.
"Non-Final Office Action", U.S. Appl. No. 12/358,955, Sep. 6, 2011, 24 pages.
"Non-Final Office Action", U.S. Appl. No. 12/358,955, Aug. 20, 2012, 33 pages.
"Non-Final Office Action", U.S. Appl. No. 12/478,446, Dec. 28, 2011, 17 pages.
"Non-Final Office Action", U.S. Appl. No. 12/484,563, Oct. 4, 2011, 13 pages.
"Non-Final Office Action", U.S. Appl. No. 12/487,425, Jan. 12, 2012, 7 pages.
"Non-Final Office Action", U.S. Appl. No. 12/534,361, Oct. 12, 2011, 11 pages.
"Non-Final Office Action", U.S. Appl. No. 12/542,845, Oct. 3, 2014, 21 pages.
"Non-Final Office Action", U.S. Appl. No. 12/542,845, Oct. 23, 2013, 29 pages.
"Non-Final Office Action", U.S. Appl. No. 12/542,845, Apr. 4, 2012, 19 pages.
"Non-Final Office Action", U.S. Appl. No. 12/616,454, Dec. 22, 2011, 8 pages.
"Non-Final Office Action", U.S. Appl. No. 12/646,721, May 8, 2014, 17 pages.
"Non-Final Office Action", U.S. Appl. No. 12/646,721, Nov. 7, 2012, 15 pages.
"Non-Final Office Action", U.S. Appl. No. 12/646,721, May 10, 2012, 15 pages.
"Non-Final Office Action", U.S. Appl. No. 12/646,802, Apr. 8, 2015, 19 pages.
"Non-Final Office Action", U.S. Appl. No. 12/646,802, May 21, 2014, 19 pages.
"Non-Final Office Action", U.S. Appl. No. 12/646,802, Mar. 29, 2012, 16 pages.
"Non-Final Office Action", U.S. Appl. No. 12/732,036, Aug. 9, 2012, 13 pages.
"Non-Final Office Action", U.S. Appl. No. 12/759,336, Oct. 4, 2012, 13 pages.
"Non-Final Office Action", U.S. Appl. No. 12/883,054, Nov. 22, 2013, 18 pages.
"Non-Final Office Action", U.S. Appl. No. 13/099,169, Mar. 28, 2013, 12 pages.
"Non-Final Office Action", U.S. Appl. No. 13/099,169, Oct. 4, 2013, 9 pages.
"Non-Final Office Action", U.S. Appl. No. 13/249,740, Mar. 26, 2013, 9 pages.
"Non-Final Office Action", U.S. Appl. No. 13/249,740, Oct. 16, 2013, 9 pages.
"Non-Final Office Action", U.S. Appl. No. 13/479,124, Sep. 27, 2013, 14 pages.
"Non-Final Office Action", U.S. Appl. No. 13/536,506, Apr. 25, 2014, 12 pages.

(56) References Cited

OTHER PUBLICATIONS

"Non-Final Office Action", U.S. Appl. No. 13/604,563, Apr. 5, 2013, 6 pages.
"Non-Final Office Action", U.S. Appl. No. 13/622,916, Sep. 10, 2014, 10 pages.
"Non-Final Office Action", U.S. Appl. No. 13/656,482, Mar. 19, 2013, 19 pages.
"Non-Final Office Action", U.S. Appl. No. 13/656,502, Feb. 21, 2013, 6 pages.
"Non-Final Office Action", U.S. Appl. No. 13/673,363, Nov. 29, 2013, 12 pages.
"Non-Final Office Action", U.S. Appl. No. 13/722,354, Jan. 17, 2014, 17 pages.
"Non-Final Office Action", U.S. Appl. No. 13/735,458, Sep. 24, 2014, 8 pages.
"Non-Final Office Action", U.S. Appl. No. 13/757,276, Jan. 30, 2014, 9 pages.
"Non-Final Office Action", U.S. Appl. No. 13/911,979, Jan. 31, 2014, 19 pages.
"Non-Final Office Action", U.S. Appl. No. 13/923,949, Dec. 17, 2013, 5 pages.
"Non-Final Office Action", U.S. Appl. No. 14/089,515, May 13, 2014, 9 pages.
"Non-Final Office Action", U.S. Appl. No. 14/275,615, Oct. 6, 2014, 28 pages.
"Non-Final Office Action", U.S. Appl. No. 14/293,640, Jul. 17, 2015, 17 pages.
"Non-Final Office Action", U.S. Appl. No. 14/466,687, Aug. 27, 2015, 15 pages.
"Non-Final Office Action", U.S. Appl. No. 14/466,687, Oct. 3, 2014, 5 pages.
"Notice of Allowance", U.S. Appl. No. 14/466,687, Dec. 18, 2015, 9 pages.
"Notice of Allowance", U.S. Appl. No. 11/945,183, Feb. 23, 2011, 7 pages.
"Notice of Allowance", U.S. Appl. No. 12/167,841, Nov. 25, 2011, 11 pages.
"Notice of Allowance", U.S. Appl. No. 12/186,429, Jun. 6, 2013, 9 pages.
"Notice of Allowance", U.S. Appl. No. 12/190,240, May 16, 2012, 4 pages.
"Notice of Allowance", U.S. Appl. No. 12/190,251, Oct. 4, 2012, 6 pages.
"Notice of Allowance", U.S. Appl. No. 12/235,333, Nov. 15, 2011, 5 pages.
"Notice of Allowance", U.S. Appl. No. 12/323,292, Jun. 28, 2013, 8 pages.
"Notice of Allowance", U.S. Appl. No. 12/358,955, Jul. 1, 2013, 8 pages.
"Notice of Allowance", U.S. Appl. No. 12/478,446, Jun. 14, 2012, 6 pages.
"Notice of Allowance", U.S. Appl. No. 12/484,563, Jul. 9, 2012, 6 pages.
"Notice of Allowance", U.S. Appl. No. 12/487,425, Jul. 26, 2013, 9 pages.
"Notice of Allowance", U.S. Appl. No. 12/534,361, Feb. 14, 2013, 12 pages.
"Notice of Allowance", U.S. Appl. No. 12/616,454, Aug. 22, 2012, 4 pages.
"Notice of Allowance", U.S. Appl. No. 12/646,802, Oct. 28, 2015, 6 pages.
"Notice of Allowance", U.S. Appl. No. 12/716,569, Apr. 19, 2012, 7 pages.
"Notice of Allowance", U.S. Appl. No. 12/732,036, Feb. 21, 2013, 8 pages.
"Notice of Allowance", U.S. Appl. No. 12/759,336, May 3, 2013, 9 pages.
"Notice of Allowance", U.S. Appl. No. 13/099,169, Feb. 12, 2014, 11 pages.
"Notice of Allowance", U.S. Appl. No. 13/249,740, Mar. 11, 2014, 6 pages.
"Notice of Allowance", U.S. Appl. No. 13/429,071, Jul. 31, 2014, 14 pages.
"Notice of Allowance", U.S. Appl. No. 13/429,090, Feb. 20, 2015, 10 pages.
"Notice of Allowance", U.S. Appl. No. 13/479,124, Jan. 30, 2014, 7 pages.
"Notice of Allowance", U.S. Appl. No. 13/604,563, Sep. 26, 2013, 5 pages.
"Notice of Allowance", U.S. Appl. No. 13/622,916, Mar. 30, 2015, 4 pages.
"Notice of Allowance", U.S. Appl. No. 13/656,482, Sep. 3, 2013, 8 pages.
"Notice of Allowance", U.S. Appl. No. 13/656,502, Jun. 25, 2013, 11 pages.
"Notice of Allowance", U.S. Appl. No. 13/673,363, Mar. 24, 2014, 4 pages.
"Notice of Allowance", U.S. Appl. No. 13/722,354, May 15, 2014, 4 pages.
"Notice of Allowance", U.S. Appl. No. 13/735,458, Jan. 12, 2015, 4 pages.
"Notice of Allowance", U.S. Appl. No. 13/923,949, Mar. 31, 2014, 6 pages.
"Notice of Allowance", U.S. Appl. No. 14/275,615, Feb. 27, 2015, 7 pages.
"Notice of Allowance", U.S. Appl. No. 14/293,640, Nov. 12, 2015, 12 pages.
"Part 11: Wireless LAN Medium Access Control (MAC) and Physical Layer (PHY) specifications", IEEE Std 802.11b-1999/Cor Jan. 2001, Amendment 2: Higher-speed Physical Layer (PHY) extension in the 2.4 GHz band, Nov. 7, 2001, 23 pages.
"Part 11: Wireless LAN Medium Access Control (MAC) and Physical Layer (PHY) specifications", IEEE Std 802.11a-1999, High-speed Physical Layer in the 5 GHz Band,1999, 91 pages.
"Part 11: Wireless LAN Medium Access Control (MAC) and Physical Layer (PHY) specifications", Information technology—Telecommunications and information exchange between systems—Local and metropolitan area networks—Specific requirements—, IEEE, Apr. 2003, pp. 1-69.
"Part 16: Air Interface for Fixed and Mobile Broadband Wireless Access Systems; Amendment 2: Physical and Medium Access Control Layers for Combined Fixed and Mobile Operation in Licensed Bands", IEEE Std 802.16e, Feb. 28, 2006, 822 pages.
"Part 16: Air Interface for Fixed Broadband Wireless Access Systems", IEEE Std. 802.16, Oct. 1, 2004, 857 pages.
"Restriction Requirement", U.S. Appl. No. 12/167,841, May 12, 2011, 6 pages.
"Search Report", European Application No. 13169350.9, Aug. 13, 2013, 10 Pages.
"SSID (Service Set Identifier)", Toshiba, Service Set Identifier and How it Enables Wireless Access; Version 1.0, Aug. 14, 2003, 3 pages.
"Supplemental Notice of Allowance", U.S. Appl. No. 12/186,429, Jul. 10, 2013, 2 pages.
"Supplemental Notice of Allowance", U.S. Appl. No. 12/323,292, Oct. 17, 2013, 2 pages.
"Supplemental Notice of Allowance", U.S. Appl. No. 12/323,292, Oct. 7, 2013, 2 pages.
"Supplemental Notice of Allowance", U.S. Appl. No. 12/358,955, Oct. 11, 2013, 3 pages.
"Supplemental Notice of Allowance", U.S. Appl. No. 12/716,569, Jul. 23, 2012, 2 pages.
"Supplemental Notice of Allowance", U.S. Appl. No. 12/759,336, Jun. 5, 2013, 2 pages.
"Supplemental Notice of Allowance", U.S. Appl. No. 12/759,336, Jun. 18, 2013, 2 pages.
"Supplemental Notice of Allowance", U.S. Appl. No. 12/759,336, Aug. 14, 2013, 2 pages.
"Supplemental Notice of Allowance", U.S. Appl. No. 13/429,071, Sep. 29, 2014, 2 pages.
"Supplemental Notice of Allowance", U.S. Appl. No. 13/429,071, Oct. 27, 2014, 2 pages.

(56) References Cited

OTHER PUBLICATIONS

"Supplemental Notice of Allowance", U.S. Appl. No. 13/429,090, Mar. 30, 2015, 2 pages.
"Supplemental Notice of Allowance", U.S. Appl. No. 13/479,124, Apr. 18, 2014, 5 pages.
"Supplemental Notice of Allowance", U.S. Appl. No. 13/622,916, May 7, 2015, 2 pages.
"Supplemental Notice of Allowance", U.S. Appl. No. 13/622,916, Jul. 10, 2015, 2 pages.
"Supplemental Notice of Allowance", U.S. Appl. No. 13/656,482, Nov. 29, 2013, 2 pages.
"Supplemental Notice of Allowance", U.S. Appl. No. 13/656,482, Dec. 19, 2013, 2 pages.
"Supplemental Notice of Allowance", U.S. Appl. No. 14/275,615, Jun. 5, 2015, 4 pages.
"Wi-Fi Peer-to-Peer (P2P) Technical Specification", Wi-Fi Alliance Technical Committee P2P Task Group; Draft Version 1.14, Jun. 25, 2010, 154 pages.
Chen, et al., "Residual Frequency Offset Tracking", WITS Lab, Institute of Communications Engineering, National Sun Yat-sen University, Apr. 29, 2004, 29 pages.
Deering, et al., "Version 6 (IPv6) Specification", RFC2460, Dec. 1998, 35 pages.
Ekici, et al., "IEEE 802.11a Throughput Performance with Hidden Nodes", IEEE Communication Letters, vol. 12, No. 6, Jun. 2008, 3 pages.
Haas, et al., "Gossip-Based Ad Hoc Routing", IEEE/ACM Transactions on Networking, vol. 14, No. 3, Jun. 2006, pp. 479-491.
Jung, et al., "A Power Control MAC Protocol for Ad Hoc Networks", Wireless Networks; The Journal of Mobile Communication, Computation and Information, Kluwer Academic Publishers vol. 11, No. 1-2, Jan. 1, 2005, 12 Pages.
Jung, et al., "A Power Control MAC Protocol for Ad Hoc Networks", In Proceedings of MOBICOM 2002, Sep. 23, 2002, pp. 36-47.
Mazzanti, et al., "Analysis and Design of Injection-Locked LC Dividers for Quadrature Generation", IEEE Journal of Solid-State Circuits, vol. 39, No. 9, Sep. 2004, pp. 1425-1433.
Mujtaba,"TGn Sync Proposal Technical Specification", IEEE 802.11-04/0889r6, This document presents the technical specification for the MAC and the PHY layer of the TGn Sync proposal to IEEE 802.11 TGn,May 18, 2005, pp. 1-131.
Qiao, et al., "Interference Analysis and Transmit Power Control in IEEE 802.11a/h Wireless LANs", IEEE / ACM Transactions on Networking, IEEE / ACM, New York, NY, US, vol. 15. No. 5, Oct. 1, 2007, 14 Pages.
Roth,"ESS and BSS Service Sets", Windows IT Pro; retrieved from http://windowsitpro.com/networking/ess-and-bss-service-sets, Sep. 2002, 1 page.
Tinnirello, et al., "Revisit of RTS / CTS Exchange in High-Speed IEEE 802.11 Networks", World of Wireless Mobile and Multimedia Networks. 2005. Wowmom 2005. Sixth IEEE International Symposium on a Taormina-Giardini Naxos, Italy Jun. 13-16, 2005 Piscataway, NJ, USA,IEEE, Los Alamitos, CA, USA, Jun. 13, 2005, 10 Pages.

* cited by examiner

DISCOVERY-PHASE POWER CONSERVATION

RELATED APPLICATION

This application is a continuation of and claims priority to U.S. patent application Ser. No. 12/646,802 filed Dec. 23, 2009 entitled DISCOVERY-PHASE POWER CONSERVATION, which claims priority to U.S. Provisional Patent Application Ser. No. 61/141,724 filed Dec. 31, 2008, the disclosure of which is incorporated by reference herein in its entirety.

BACKGROUND

Wireless local area networks (WLANs) often communicate at frequencies subject to government regulations. In the United States for example, some frequencies in the five Giga-Hertz (GHz) band are restricted because the United States' military uses these frequencies for radar. These restrictions require client stations of a WLAN to passively scan for radar at the desired frequency for a mandated period of time. If a client station does not find radar at the desired frequency during that period of time, the client station may then communicate at that frequency as part of the WLAN. During this mandated period of time, access points of WLANs often expend significant amounts of power attempting to establish communications with client stations.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

This Summary is provided to introduce a selection of concepts in a simplified form that are further described below in the Detailed Description.

A system-on-chip (SoC) is described that implements a power conserver for conserving power during a discover phase of a wireless local area network (WLAN). The SoC conserves power by reducing power at an access point of a (WLAN) for a reduced-power-usage period, the access point operating in a geographical region and at a frequency in which client stations operating in the geographical region and at the frequency are required to passively search for radar transmissions prior to transmitting at the frequency. During the reduced-power-usage period, the power at the access point is insufficient to enable the access point to receive communication from a client station within a communication region of the access point. The reduced-power-usage period at the access point can vary according to information received by the access point from one of the client stations indicating a radar search period for the client station. Following this reduced-power-usage period, the SoC increases the power at the access point for a reception period in which communication from a client station within a communication region of the access point can be received.

Another SoC embodiment is described that implements a power conserver for conserving power during a discover phase of a WLAN by transmitting, from an access point of the WLAN, a first beacon, the first beacon to discover a client station with which to establish communication, maintaining power usage at the access point for a first reception period, the power usage sufficient to enable receiving a probe request from the client station, responsive to not receiving the probe request from the client station during the first reception period and prior to establishing communication with the client station, reducing power usage at the access point after the first reception period ends and for a reduced-power-usage period, the reduced-powered-usage period insufficient to enable receiving the probe request from the client station. The SoC can also vary the reduced-power-usage period at the access point according to information received by the access point from the client station indicating a radar search period for the client station.

This embodiment of the SoC continues the power conservation by transmitting, from the access point, a second beacon, the second beacon to discover the client station, and maintaining power usage at the access point for a second reception period, the power usage sufficient to enable receiving the probe request from the client station. Then, responsive to receiving the probe request from the client station during the second reception period, responding to the probe request with a probe response, the probe response part of establishing communication with client station.

In another embodiment, a wireless communication device, including a wireless transmitter, a wireless receiver, and a power conserver, is described. The power conserver enables the wireless communication device to conserve power during operation by causing a wireless transmitter to transmit a first beacon, the first beacon to discover a client station with which to establish communication, and maintaining power usage at the wireless communication device for a first reception period, the power usage sufficient to enable receiving a probe request from the client station. Responsive to a wireless receiver not receiving the probe request from the client station during the first reception period and prior to establishing communication with the client station, the power conserver continues by reducing power usage at the wireless communication device after the first reception period ends and for a reduced-power-usage period, the reduced-powered-usage period insufficient to enable receiving the probe request from the client station. The power conserver can also vary the reduced-power-usage period at the wireless communication device according to information received by the wireless communication device from the client station indicating a radar search period for the client station.

This embodiment of the power conserver continues the power conservation by causing the wireless transmitter to transmit a second beacon, the second beacon to discover the client station, and maintaining power usage at the wireless communication device for a second reception period, the power usage sufficient to enable receiving the probe request from the client station. Then, responsive to the wireless receiver receiving the probe request from the client station during the second reception period, causing the wireless transmitter to respond to the probe request with a probe response, the probe response part of establishing communication with client station.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Conventional techniques for establishing communications in a wireless network often use significant amounts of power. This disclosure describes techniques and apparatuses for conserving this power.

In the discussion that follows, an example operating environment is described. Example methods are also described that may be employed in the example operating environment as well as other environments. These methods are followed by an example System-on-Chip (SoC) embodiment in which components of FIG. 1 may be embodied. In the discussion below, reference is made to the environment by way of example only and, therefore, implementations described below are not limited to the example environment.

Example Operating Environment

Figure 1:
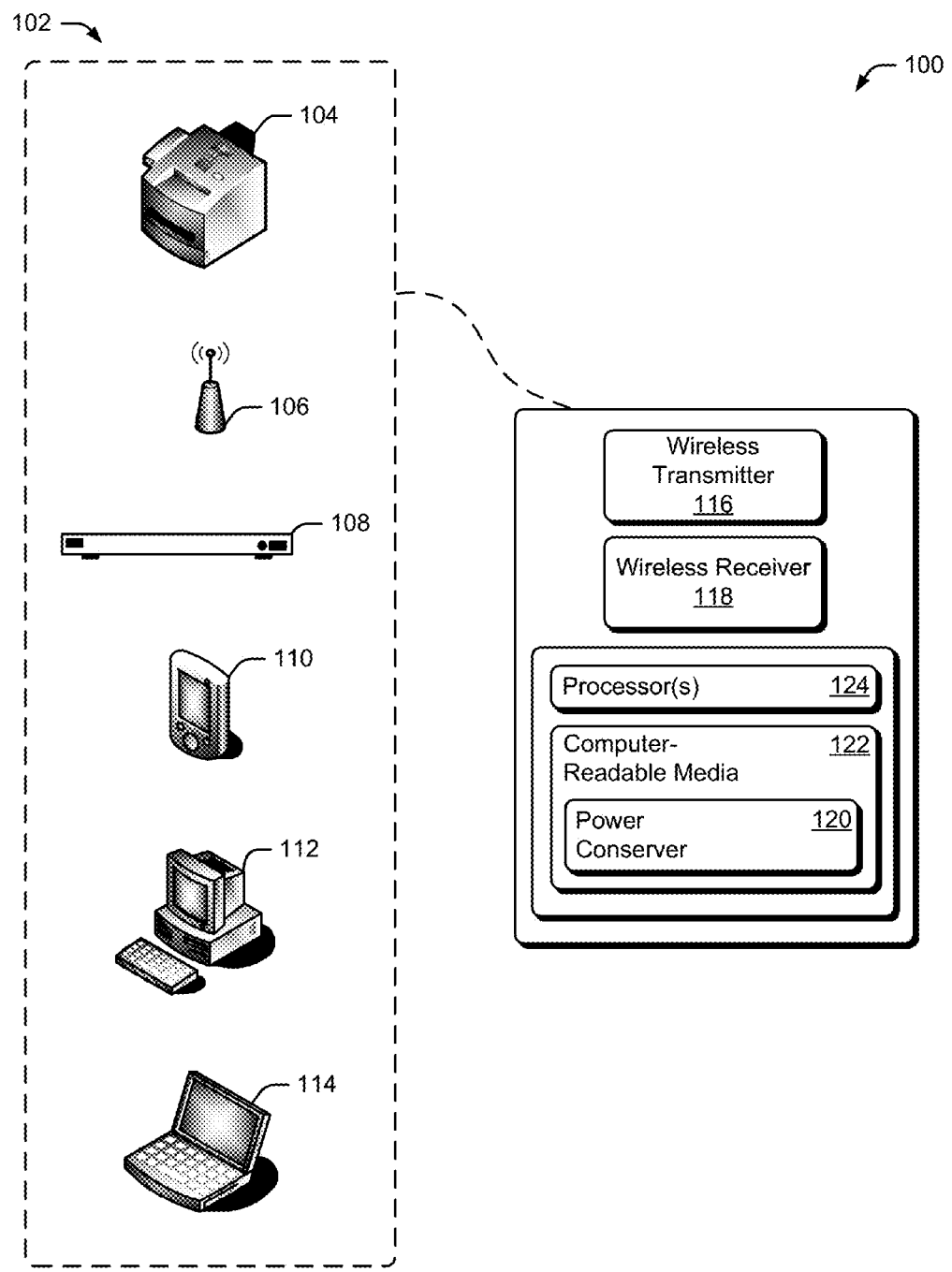
FIG. 1 illustrates an example operating environment having wireless-communication-capable devices.

FIG. 1 illustrates an example operating environment 100 having wireless-communication-capable devices 102, all of which are capable of transmitting and receiving wireless communications, such as those of a wireless local area network (WLAN). Devices 102 are shown to include a printing device 104, a dedicated WLAN access point 106, a set-top box 108, and personal computing devices including a cellular phone 110, a desktop computing device 112, and a laptop computing device 114. Any of these devices may act as a WLAN access point or a client station of the WLAN except dedicated WLAN access point 106, which is configured to act only as an access point of the WLAN.

In this example environment, each of devices 102 includes a wireless transmitter 116, a wireless receiver 118, and a power conserver 120. Transmitter 116 is capable of transmitting a wireless communication signal according to one or more communication protocols, such as those for a WLAN. This protocol may include, by way of example only, those of the IEEE 802.11 family of protocols.

Receiver 118 is capable of receiving a wireless communication signal according to one or more communication protocols, such as those noted for transmitter 116. Transmitter 116 and receiver 118 may be separate components (as shown in FIG. 1) or be combined (in which case the combination may be referred to as a transceiver). Also, transmitter 116 and receiver 118 may be implemented in hardware in combination with (or separate from) software. Transmitter 116 and receiver 118 are capable of establishing communications during a discovery phase, such by using handshake protocols, after which devices 102 may establish post-discovery, ongoing communications.

Power conserver 120 is capable of enabling a wireless device acting as an access point of a wireless network (e.g., WLAN) to conserve power. In one implementation, power conserver 120 does so by reducing an access point's power consumption during a period in which client stations may otherwise be unable to establish communications with the access point.

In some cases client stations are unable to establish communications during a period in which the client stations are required to passively scan for radar. Government restrictions depend on the geographical region and frequency at which communications in the wireless network are desired; geographical regions are subject to different governments and thus government regulations, such those of the Federal Communications Commission (FCC) of the U.S. government, or those of various governments of the European Union, Japan, China, Canada, and Australia, to name a few. The FCC currently requires a passive radar scan of 60 seconds at various frequencies in the five GHz band.

In one implementation, power conserver 120 includes a set of computer-executable instructions stored on computer-readable media 122. When executed by one or more processors 124, device 102 acts according to those instructions. Power conserver 120 may act independently or in conjunction with various other entities, such as transmitter 116 and receiver 118. Power conserver 120 may be separate from on integral with other entities of one of devices 102 as well, such as by being firmware integrated into a System-on-Chip (SoC) having transmitter 116 and receiver 118.

Example Power-Conservation Techniques

The following discussion describes techniques that may be implemented utilizing the previously described environment. Aspects of these techniques may be implemented in hardware, firmware, software, or a combination thereof. These techniques include methods illustrated in FIGS. 2 and 5, each of which is shown as a set of blocks that specify operations performed by one or more entities. These methods are not necessarily limited to the orders shown for performing the operations by the respective blocks.

Figure 2:
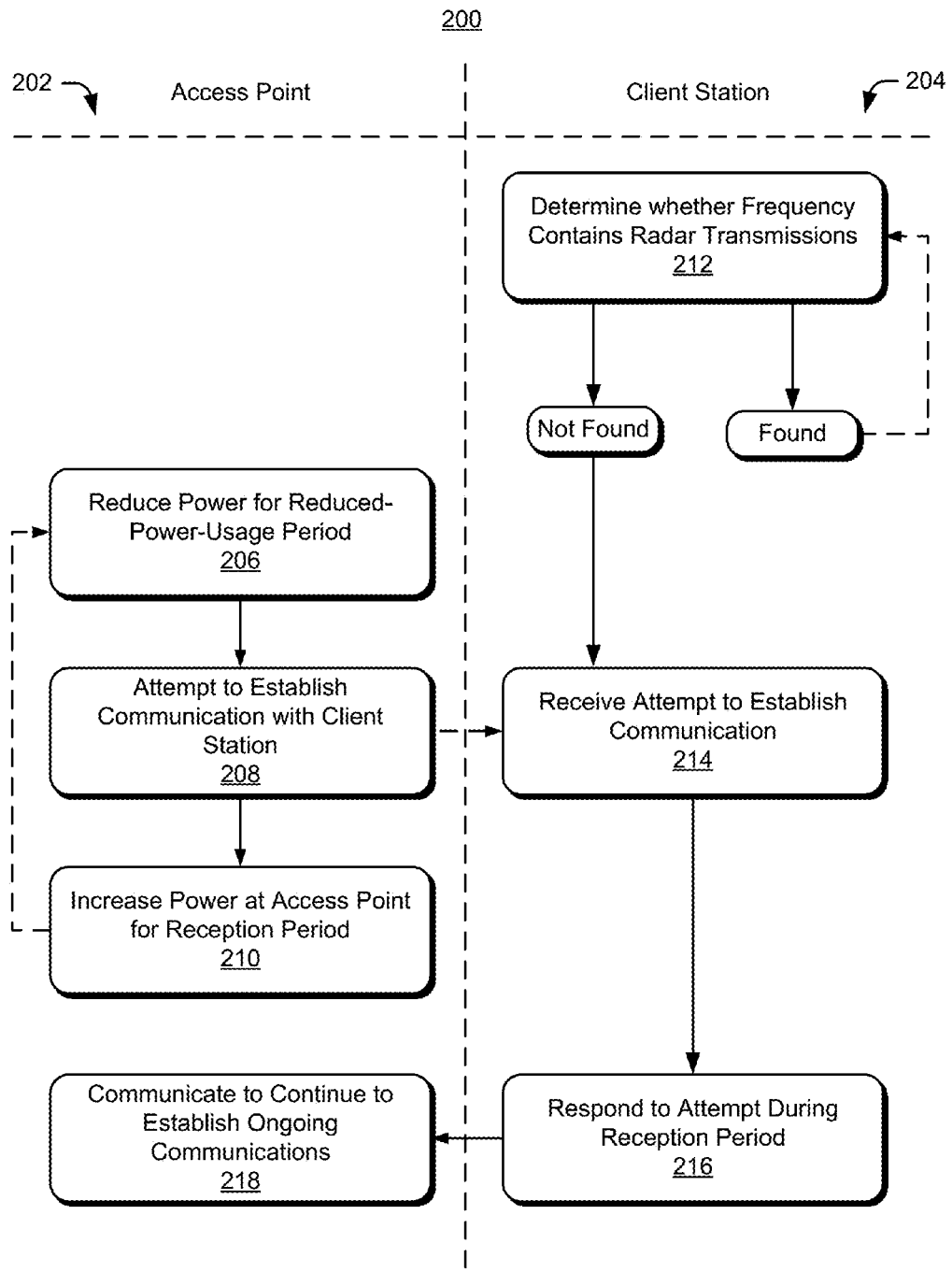
FIG. 2 illustrates a method for conserving power during a discovery phase of a wireless network.

FIG. 2 depicts a method 200 for conserving power during a discovery phase of a wireless network, including operations performed by an access point (shown at arrow 202) and a client station (shown at arrow 204), both separated by a vertical dashed line. The operations of the access point and client station are shown side-by-side to illustrate possible interrelations, though the access point and client station may operate independently.

At 206, an access point of a wireless local area network (WLAN) reduces power for a reduced-power-usage period. In one implementation, the access point reduces power while the access point is attempting to establish communications with client stations. Here client stations, in at least some cases, are not able to respond or otherwise actively communicate with the access point.

Figure 3:
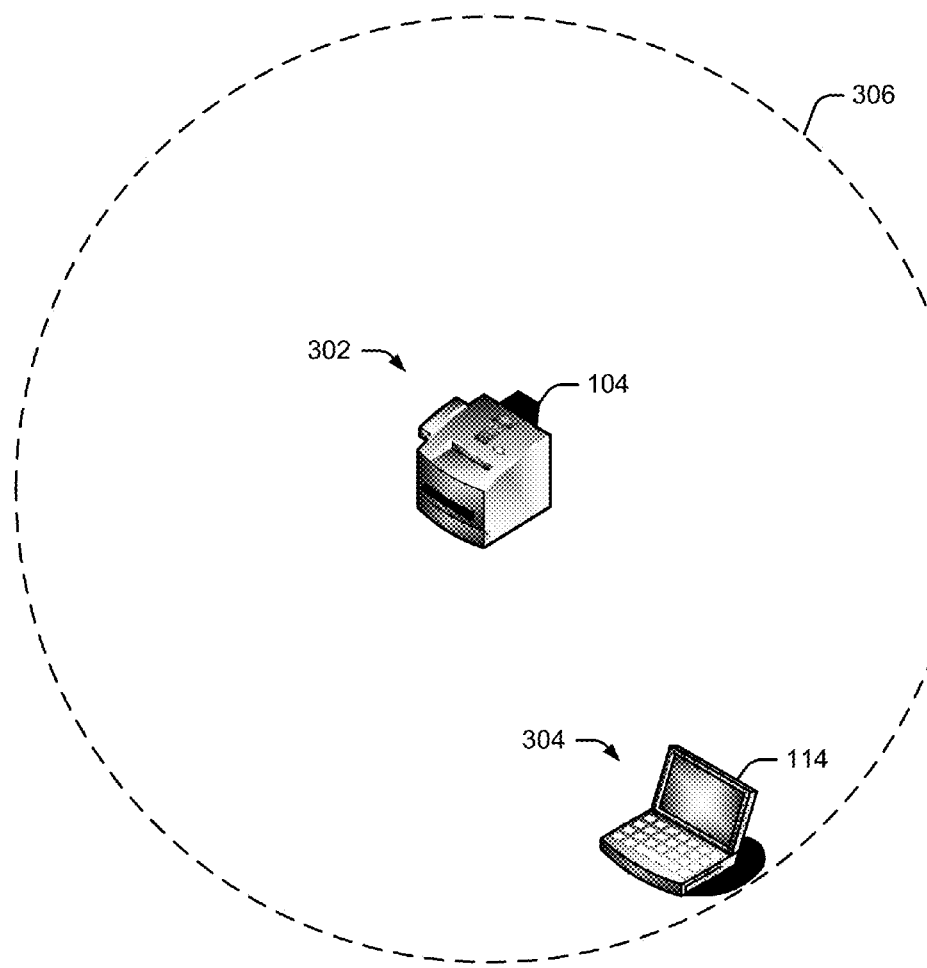
FIG. 3 illustrates a WLAN having an access point, a client station, and a communication region.
Figure 4:
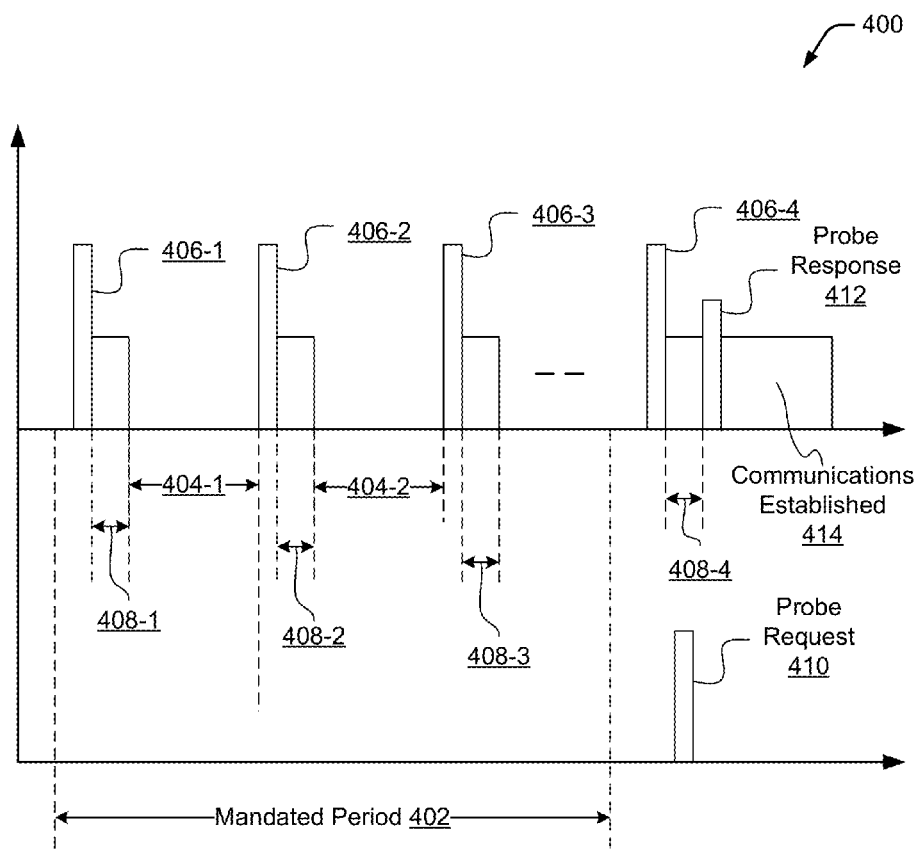
FIG. 4 illustrates an example timeline for establishing communications between devices of a WLAN when subject to a government-mandated passive-reception period.

By way of example, consider FIGS. 3 and 4. FIG. 3 illustrates devices of a WLAN. FIG. 4 illustrates an example timeline 400 for establishing communications between devices of a WLAN when subject to a government-mandated passive-reception period 402 (mandated period 402).

In more detail, FIG. 3 illustrates printing device 104 acting as an access point 302, and laptop computing device 114 acting as a client station 304. Access point 302 and client station 304 are attempting, as part of a discovery phase, to find and establish communications. A communication region 306 represents a region in which access point 302 may communicate with client stations (here the region includes client station 304, though in some cases more or no client stations may reside in this region). Note that these two devices are examples of devices 102 of FIG. 1 and that both may include the elements shown for device 102 (e.g., power conserver 120). This example illustrates an ad-hoc WLAN structure, the structure having device-to-device communications rather than a dedicated access point-to-device structure, though either structure may be used.

Access point 302 is operating in a geographical region and at a frequency in which a government-mandated passive-reception period (illustrated in FIG. 4 as mandated period 402) requires client stations 304 that are operating in the geographical region and at the frequency to passively search for radar transmissions prior to transmitting at the frequency. Thus, for at least this mandated period 402, power consumption by access point 302 may be reduced or eliminated without necessarily causing significant delay in establishing communication with client station 304. As noted in operation 206, power may be conserved for a particular reduced-power-usage period. An example reduced-power-usage period is shown at 404 in FIG. 4. This power conservation may render access point 302 incapable of receiving communication from client station 304.

At 208, the access point actively attempts to establish communications with a client station. This attempt can include transmitting a beacon, which may or may not indicate a reception period described at 210. Continuing the ongoing example, access point 302 transmits beacon 406-1 of beacons 406, illustrated in FIG. 4. Beacon 406-1 is not responded to by client station 304 because client station 304 may not respond during mandated period 402.

At 210, subsequent to the reduced-powered-usage period, power is increased at the access point for a reception period, the reception period enabling reception of communication, such as from a client station. Here access point 302 increases power sufficient for its receiver 118 to receive a communication from transmitter 116 of client station 304 for reception period 408-1. Client station 304 later communicates a probe request 410, though (in one implementation) not during reception period 408-1.

Operations 206, 208, and 210 can be performed until a client station replies to the access point's attempt to establish communications. Thus, if no communication is received at 210, the access point may return to operation 206 (shown with a dashed line proceeding from 210 to 206). An example of this repetition is illustrated in FIG. 4, in which multiple reduced-power-usage periods 404 (404-1, 404-2, and 404-3) and reception periods 408 (408-1, 408-2, and 408-3) reside within mandated period 402. While these operations 206, 208, and 210 may repeat, period 406 and/or 408 are not necessarily identical.

While the example provided includes a government-mandated period, these techniques can conserve power during other times, such as times in which client stations are either unable, required to refrain from, or are not present to establish communications with an access point of the WLAN.

Having described operations of a device acting as or being a dedicated access point, the discussion turns to those of a client station, namely those shown at arrow 204 of FIG. 2. At 212, a client station determines whether a frequency contains radar transmissions. Client station 304 may do so following one or even many reduced-power-usage periods 404 and during mandated period 402. If radar is found at the frequency (shown at "Found" in FIG. 2), the client station returns to 212, which the client station may repeat at the same or a different frequency. If radar is not found (shown at "Not Found"), the client station proceeds to 214.

At 214, the client station receives an attempt to establish communication. Continuing the ongoing example of FIGS. 3 and 4, client station 304 receives beacon 406-4. Note that mandated period 402 is complete.

At 216, the client station replies to the attempt to establish communication during the reception period. As noted, this reception period may be indicated (e.g., advertised and included in beacons 406) or not indicated. If not indicated, the client station may have received the reception period previously, the reception period may be standardized, or the client station may simply respond within the reception period without any knowledge of the reception period.

At 218, the access point communicates according to a handshake protocol to continue to establish ongoing communications with the client station. In the ongoing example, operation 218 is preceded at 216 with client station 304 replying with probe request 410 during reception period 408-4 after determining that no radar transmission is found. Following this reply, at 218 access point 302 transmits probe response 412 to establish communications shown at 414. These or further communications may complete a handshake protocol to establish ongoing communications (e.g., those standard to IEEE 802.11 discovery-phase WLAN protocols).

Figure 5:
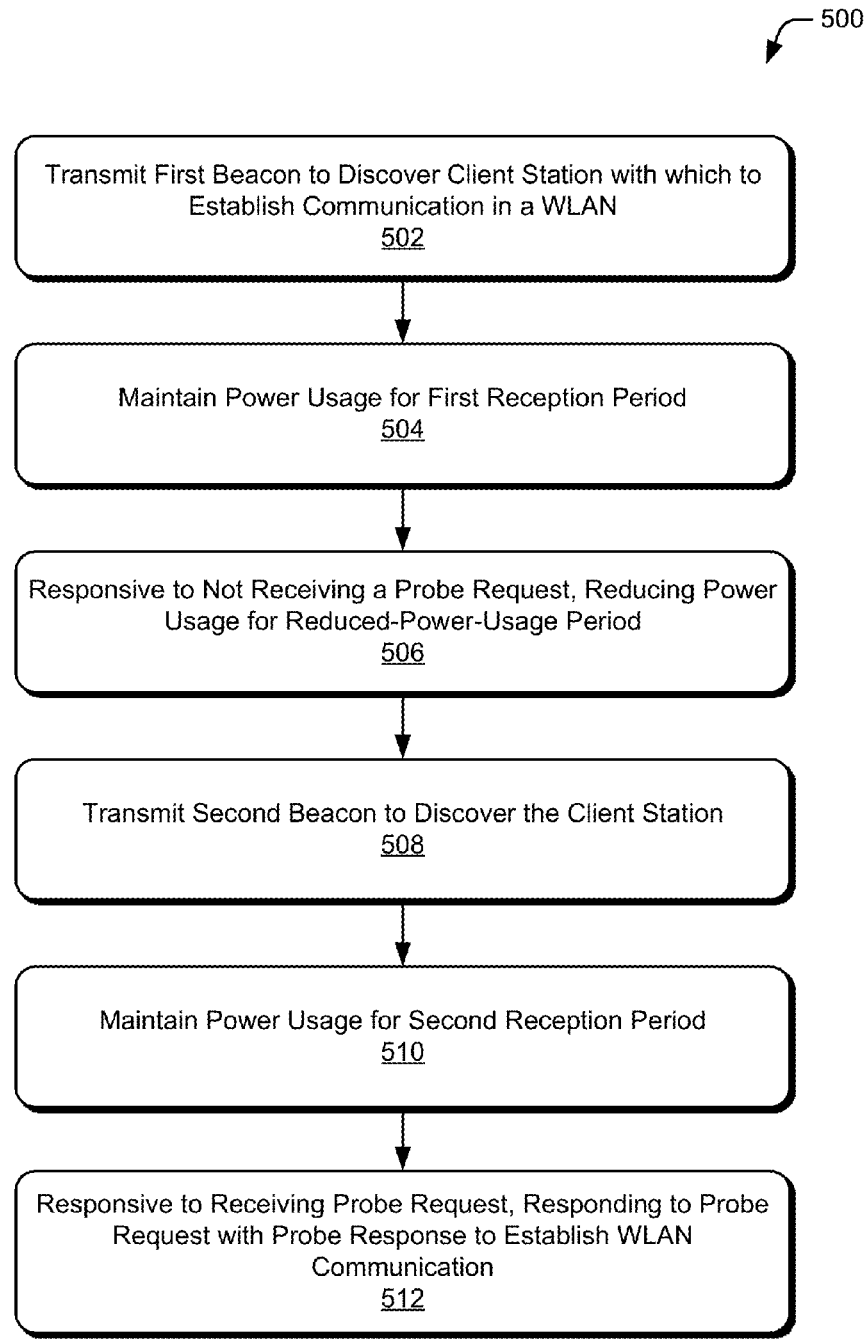
FIG. 5 illustrates a method performed by an access point of a WLAN to conserve power during a discovery phase of the WLAN.

FIG. 5 depicts a method 500 for conserving power during a discovery phase of a wireless network. This method parallels operations illustrated at arrow 202 in FIG. 2, though with greater specificity concerning some operations, greater generality in other operations, and additional operations not shown at arrow 202.

At 502, an access point of a wireless local area network (WLAN) transmits a beacon, the beacon to discover a client station with which to establish communication. FIG. 4 illustrates example beacons at 406.

At 504, the access point maintains power usage at the access point for a first reception period, the power usage sufficient to enable reception of a probe request from the client station. Examples of this first reception period are shown at any of reception periods 408-1, 408-2, or 408-3 of FIG. 4.

At 506, the access point, responsive to not receiving the probe request from the client station during the first reception period, reduces power usage at the access point after the first reception period ends and for a reduced-power-usage period, the reduced-powered-usage period insufficient to enable receiving the probe request from the client station. Examples of this are illustrated at any of periods 404-1, 404-2, or 404-3 of FIG. 4.

At 508, the access point transmits a second beacon, the second beacon to discover the client station (or another client station) with which to establish communication. FIG. 4 illustrates example beacons at 406, though in this case the second beacon is assumed to be one to which a reply is made, though there may be intervening repetitions of operations 502, 504, 506, and 508 prior to a reply being received.

At 510, the access point maintains power usage at the access point for a second reception period, the power usage sufficient to enable reception of a probe request from the client station. An example of this second reception period is shown at 408-4 of FIG. 4.

At 512, the access point, responsive to receiving a probe request from a client station, responds with a probe response to establish ongoing communications. An example of this probe request is shown at 410, an example of this probe response is shown at 412, and an example of this communication established is shown at 414, all of FIG. 4.

In some cases the first beacon indicates a first amount of time that the access point is capable of receiving a probe request from the client station. The second may also or instead indicate a second amount of time that the access point will be capable of receiving a probe request from the client station, though these times are not necessarily identical. These times may be different based on various factors, including a history of how quickly client stations reply. If replies have historically been made more quickly than the reception period, the access point may reduce the reception period to conserver more power.

Similarly, reduced-power-usage periods may be altered or vary. If, for example, the access point is rarely communicated with, such as the access point being a printing device that is only used for occasional printing tasks, the access point may record this history and extend its reduced-power-usage period to further conserve power. When subject to government mandates (e.g., to search for radar), the access point may receive information indicating that a mandated period for client stations has been changed. Based on this information the access point may alter any of its reception and/or reduced-power-usage periods.

System-on-Chip Example

Figure 6:
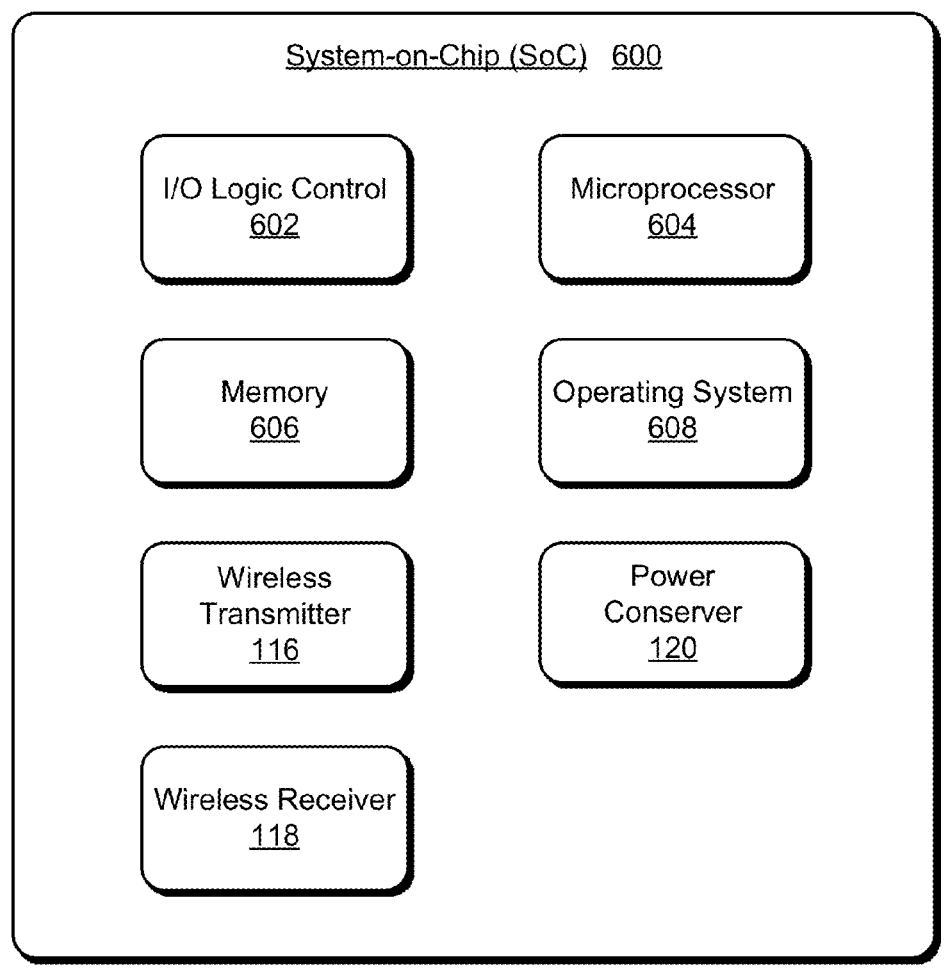
FIG. 6 illustrates an example System-on-Chip (SoC) environment for implementing embodiments of the techniques described herein.

FIG. 6 illustrates an example System-on-Chip (SoC) 600, which can implement various embodiments described above. An SoC can be implemented in a fixed or mobile device, such as one or a combination of a media device, computer device, television set-top box, video processing and/or rendering device, appliance device, gaming device, electronic device, vehicle, workstation, WLAN access point or client station, and/or in any other type of device that may communicate wirelessly in a local or personal area network. Examples of some of these are shown in FIG. 1 at 102.

SoC 600 can be integrated with electronic circuitry, a microprocessor, memory, input-output (I/O) logic control, communication interfaces and components, other hardware, firmware, and/or software needed to run an entire device. SoC 600 can also include an integrated data bus (not shown) that couples the various components of the SoC for data communication between the components. A device that includes SoC 600 can also be implemented with many combinations of differing components.

In this example, SoC 600 includes various components such as an input-output (I/O) logic control 602 (e.g., to include electronic circuitry) and a microprocessor 604 (e.g., any of a microcontroller or digital signal processor). SoC 600 also includes a memory 606, which can be any type of random access memory (RAM), a low-latency nonvolatile memory (e.g., flash memory), read only memory (ROM), and/or other suitable electronic data storage. SoC 600 can also include various firmware and/or software, such as an operating system 608, which can be computer-executable instructions maintained by memory 606 and executed by microprocessor 604. SoC 600 can also include other various communication interfaces and components, wireless LAN (WLAN) or PAN (WPAN) components, other hardware, firmware, and/or software.

SoC 600 may include wireless transmitter 116, wireless receiver 118, and power conserver 120 (in either or multiple devices as noted above). Examples of these various components, functions, and/or entities, and their corresponding functionality, are described with reference to the respective components of the example environment 100 shown in FIG. 1.

Power conserver 120 in SoC 600, either independently or in combination with other entities, can be implemented as computer-executable instructions maintained by memory 606 and executed by microprocessor 604 to implement various embodiments and/or features described herein. Power conserver 120 may also be provided integral with other entities of the SoC, such as integrated with one or both of wireless transmitter 116 and wireless receiver 118. Alternatively or additionally, power conserver 120 and the other components can be implemented as hardware, firmware, fixed logic circuitry, or any combination thereof that is implemented in connection with the I/O logic control 602 and/or other signal processing and control circuits of SoC 600.

Although the subject matter has been described in language specific to structural features and/or methodological operations, the subject matter defined in the appended claims is not necessarily limited to the specific features or operations described above, including orders in which they are performed.

What is claimed is:

1. A System-on-Chip (SoC) comprising:
a processor; and
a computer-readable storage memory device embodying computer-executable instructions, that, when executed by the processor, implement a power conserver configured to conserve power during a discovery phase of a wireless local area network (WLAN) by:
reducing power at an access point of the WLAN for a reduced-power-usage period, the access point operating in a geographical region and at a frequency in which client stations operating in the geographical region and at the frequency are required to passively search for radar transmissions prior to transmitting at the frequency, the reduced power being insufficient to enable the access point to receive communication from a client station within a communication region of the access point, the reduced-power-usage period at the access point being configured to vary according to information received by the access point from one of the client stations indicating a radar search period for the client station; and
increasing power at the access point subsequent to expiration of the reduced-power-usage period, the power being increased for a reception period in which communication from the client station or another client station within the communication region of the access point can be received.

2. The SoC of claim 1, wherein the client stations are required to passively search for radar transmissions for the radar search period prior to transmitting at the frequency.

3. The SoC of claim 2, wherein the radar search period is sixty seconds and the frequency is in a five Giga-Hertz band.

4. The SoC of claim 2, wherein reducing power and increasing power are performed multiple times during the radar search period.

5. The SoC of claim 1, further comprising, subsequent to expiration of the reduced-power-usage period, transmitting the reception period.

6. The SoC of claim 5, wherein the transmitting the reception period comprises transmitting a beacon, the beacon being part of a handshake protocol of the discovery phase.

7. A System-on-Chip (SoC) comprising:
a processor; and
a computer-readable storage memory device embodying computer-executable instructions, that, when executed by the processor, implement a power conserver configured to conserve power during a discovery phase of a wireless local area network (WLAN) by:
transmitting, from an access point of the WLAN, a first beacon, the first beacon to discover a client station with which to establish communication;

maintaining power usage at the access point for a first reception period, the power usage sufficient to enable receiving a probe request from the client station;

responsive to not receiving the probe request from the client station during the first reception period and prior to establishing a communication with the client station, reducing power usage at the access point after the first reception period ends and for a reduced-power-usage period, the reduced-power-usage period insufficient to enable receiving the probe request from the client station, the reduced-power-usage period at the access point being configured to vary according to information received by the access point from the client station indicating a radar search period for the client station;

transmitting, from the access point, a second beacon, the second beacon to discover the client station;

maintaining power usage at the access point for a second reception period, the power usage sufficient to enable receiving the probe request from the client station; and responsive to receiving the probe request from the client station during the second reception period, responding to the probe request with a probe response, the probe response part of establishing the communication with the client station.

8. The SoC of claim 7, wherein:
transmitting the first beacon includes transmitting the first reception period, the first reception period indicating a first amount of time that the access point is capable of receiving the probe request from the client station; and
transmitting the second beacon includes transmitting the second reception period, the second reception period indicating a second amount of time that the access point is capable of receiving the probe request from the client station.

9. The SoC of claim 8, wherein the first reception period and the second reception period are identical amounts of time.

10. The SoC of claim 8, wherein the first reception period and the second reception period are different amounts of time determined based, at least in part, on a history of how quickly the access point receives the probe request from the client station.

11. The SoC of claim 10, wherein the SoC is implemented in one of:
a mobile device;
a computing device;
a media playback device;
a video rendering device;
an appliance device;
a gaming device;
a vehicle; or
a WLAN access point.

12. The SoC of claim 7, wherein the client station is required to refrain from transmitting the probe request during the radar search period.

13. The SoC of claim 7, wherein the client station is permitted to transmit the probe request if the client station does not receive radar transmissions during the radar search period.

14. The SoC of claim 7, wherein the radar search period is sixty seconds, and the probe request is transmitted in a five Giga-Hertz range.

15. The SoC of claim 7, wherein the first and second beacons are part of a handshake protocol of the discovery phase.

16. The SoC of claim 7, wherein the access point is a printing device and the client station is a personal computing device.

17. The SoC of claim 7, further comprising, prior to transmitting the second beacon:
transmitting, from the access point, a third beacon, the third beacon to discover the client station;
maintaining power usage at the access point for a third reception period, the power usage sufficient to enable receiving the probe request from the client station; and
responsive to not receiving the probe request from the client station during the third reception period, reducing power usage at the access point after the third reception period ends and for a second reduced-power-usage period, the second reduced-power-usage period insufficient to enable receiving the probe request from the client station.

18. The SoC of claim 17, further comprising:
receiving, at the access point, an indication that the radar search period has changed; and
responsive to receiving the indication, altering the reduced-power-usage period.

19. A wireless communication device comprising:
a wireless transmitter;
a wireless receiver; and
a power conserver configured to conserve power during operation of the wireless communication device by:
causing the wireless transmitter to transmit a first beacon, the first beacon to discover a client station with which to establish communication;
maintaining power usage of the wireless communication device for a first reception period, the power usage sufficient to enable the wireless receiver to receive a probe request from the client station;
responsive to the wireless receiver not receiving the probe request from the client station during the first reception period and prior to establishing a communication with the client station, reducing power usage of the wireless communication device after the first reception period ends and for a reduced-power-usage period, the reduced-power-usage period insufficient to enable receiving the probe request from the client station, the reduced-power-usage period at the wireless communication device being configured to vary according to information received by the wireless receiver from the client station indicating a radar search period for the client station;
causing the wireless transmitter to transmit a second beacon, the second beacon to discover the client station;
maintaining power usage of the wireless communication device for a second reception period, the power usage sufficient to enable receiving the probe request from the client station; and
responsive to the wireless receiver receiving the probe request from the client station during the second reception period, causing the wireless transmitter to respond to the probe request with a probe response, the probe response part of establishing the communication with the client station.

20. The wireless communication device of claim 19, wherein the wireless communication device is an access point of a wireless local area network (WLAN).

* * * * *